April 22, 1930.  H. G. TISSOT  1,755,342
LIFTING ATTACHMENT FOR AEROPLANE WINGS
Filed Aug. 5, 1929
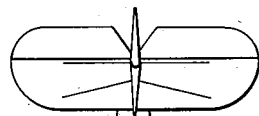
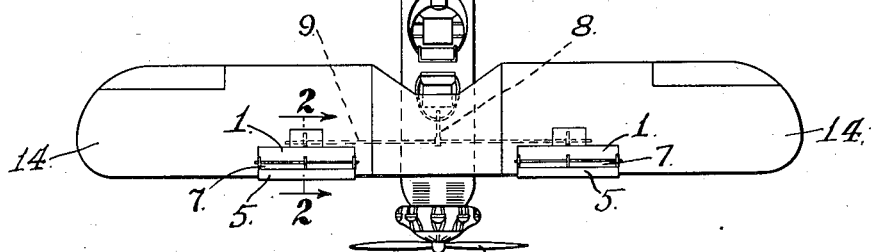
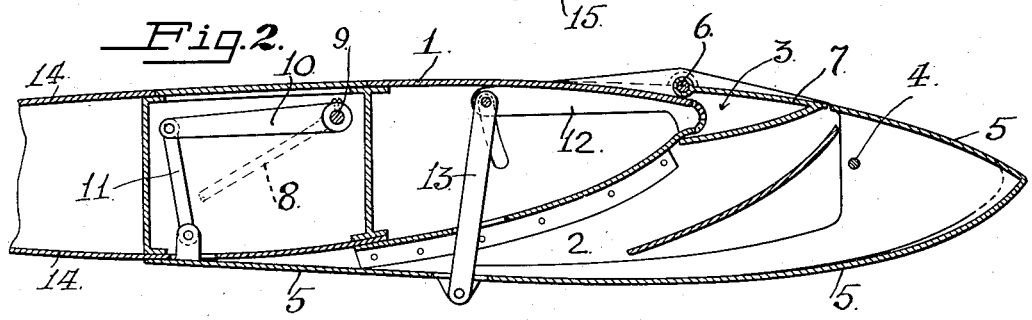
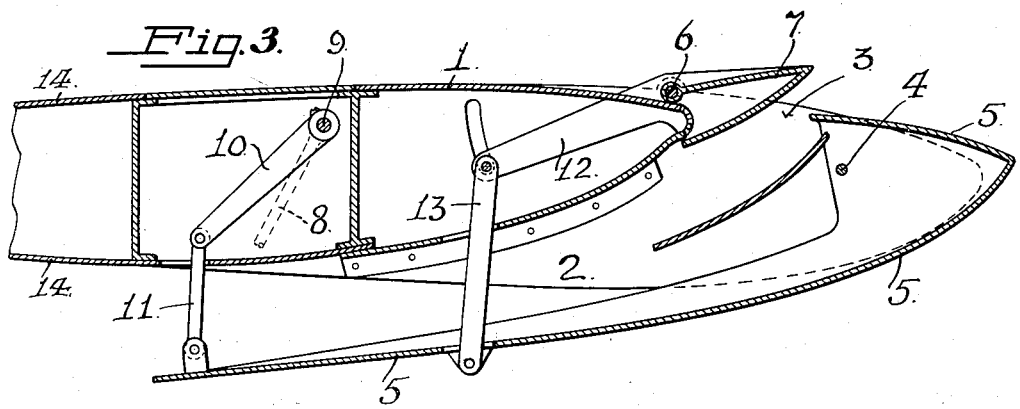
INVENTOR,
Henri Gustave Tissot.
BY Booth & Booth
ATTORNEYS.

Patented Apr. 22, 1930

1,755,342

UNITED STATES PATENT OFFICE

HENRI GUSTAVE TISSOT, OF WEST OAKLAND, CALIFORNIA

LIFTING ATTACHMENT FOR AEROPLANE WINGS

Application filed August 5, 1929. Serial No. 383,645.

My invention relates to aeroplanes. It consists in a novel attachment to the aeroplane wing, the object of which, though directed generally to lifting capacity and its control, is especially intended, under proper manipulation, to cause the machine to leave the ground within an appreciably shorter distance than usual.

The attachment is a device or unit inserted in the front edge of the wing in the vicinity of the propeller and exposed to the air pressure induced thereby, said device comprising an adjustable deflector plate under the wing, a supplementary deflector plate above the wing, and suitable control connections for operating said plates.

In the accompanying drawings, I have shown the attachment in its preferred form, it being understood that changes in structure and arrangement may be made without departing from the spirit of the invention as defined by the claims hereunto appended.

Referring to the drawings:—

Fig. 1 is a top plan of an aeroplane showing the location of my lifting attachment.

Fig. 2 is a cross section, enlarged, of the attachment, as indicated by the line 2—2 Fig. 1, the device being shown in a closed, inactive condition.

Fig. 3 is a similar section, the attachment being opened in active condition.

1 is a shell or frame having an open bottom 2, and in the front of its top an opening 3 which communicates through the interior of the shell with the open bottom thereof.

Hinged at 4 at the front of the shell is the lower deflector plate 5 adapted to swing about its hinge axis to and from the bottom of the shell.

Hinged by its rear edge at 6 to the top of the shell is the supplementary deflector plate 7, adapted to swing about its hinge axis to and from the upper surface of the shell and to close and open the top opening 3.

The two deflector plates are operated in unison by any suitable control connections. As an example, I have shown a control lever 8, a rock shaft 9, a crank 10, and a link 11 to the lower plate 5; and cranks 12 and links 13 from said lower plate to the upper plate 7, these parts being mounted and housed, as far as possible, within the shell 1, the shaft 9 and the control lever 8 being outside said shell.

In Fig. 1, I show the application of the device to the aeroplane, the latter being delineated more or less in outline, as its details do not concern my invention. The front of the wing 14 from its front edge backwardly is cut out to form a recess or seat into which the shell 1 with its attached parts is fitted and secured in such manner, as shown in Fig. 2 that in conjunction with its deflector plates 5 and 7, it fills the recess formed by cutting out the wing front, and substitutes a new front at that place, which is in all respects like unto, coincides with and continues the contour of the wing surfaces at the front edge, the upper surface and the lower surface.

In this position, the lower deflector plate 5 lies under the wing and when closed up as in Fig. 2 against the open bottom of the shell, practically forms part of, and due to its shape coincides with the bottom surface of the wing. The upper deflector plate when closed down, as in Fig. 2, over the top opening 3 of the shell practically, in conjunction with the top wall of the shell, continues and coincides with the upper surface of the wing. The front edge of the lower deflector 5 continues and coincides with the front edge of the wing.

The location of this lifting unit is close enough to the propeller 15 to be exposed to the air pressure therefrom; and, as indicated in Fig. 1, each wing 14 of the aeroplane is fitted with said lifting unit, the control of their adjustable parts being simultaneous by means of the lever 8 within reach of the aviator. When about to start, the lifting unit is inactive by reason of the lower deflector plate being closed up, and the upper deflector plate being closed down, as shown in Fig. 2, so that the wings of the plane present their normal surface contours. But after starting, the aviator, as soon as he deems it proper, turns down the lower deflector plate and lifts up the upper deflector plate as shown in Fig. 3. The lower plate is, in fact, the essential and principal member of the unit, even to the extent of omitting if desired the upper plate, the latter being for supplemental effect. The dropping of the lower plate to the extent deemed best by the aviator, so changes the surface contour of the lower face of the wing, that by reason of the more or less abrupt downward deflection by said plate of the air current from the propeller, there is a marked tendency to lift the plane with a pressure greater and in a shorter distance than otherwise. This tendency or effect is augmented by the lifted upper deflector plate which receives the current from the propeller which passes above the wing and directs it downwardly through the opening 3 into and through the shell 1 with lifting pressure therein, said current passing out through the open shell bottom 2 and joining the main current underneath.

During flight and landing the aviator will control the lifting unit as may be necessary, thus making use of its effect not only in starting but at other times as his experience and skill may direct.

I claim:—

1. In combination with the wing of an aeroplane, a lifting attachment comprising a deflector plate underlying the wing and hinged at its front edge thereto, adapting it for angular adjustment about its hinge axis to and from the plane of the wing's under surface, the front edge of said plate forming part of and coinciding with the front edge of the wing; an overlying supplementary deflector plate hinged at its rear edge for angular adjustment to and from the plane of the upper surface of the wing, said wing having a through passage leading from and controlled by said upper deflector plate and opening below to the rear of the lower deflector plate; and means, under control of the aviator, for adjusting said deflector plates.

2. In combination with the wing of an aeroplane, said wing having a recessed front edge, a shell seated in the recess of the wing, said shell having a front top opening and an open bottom and an interior passage between said top opening and open bottom; a deflector plate hinged at its front edge to the front of the shell, the front edge of said plate forming part of and coinciding with the front edge of the wing, said plate underlying the wing, and being angularly movable about its hinge axis to and from the plane of the under surface of the wing to control the open bottom of the shell; a supplementary deflector plate overlying the wing and hinged by its rear edge to the top of the shell, said plate being adapted for angular movement about its hinge axis to and from the plane of the upper surface of the wing, and to control the top opening of said shell; and means for adjusting said plates.

In testimony whereof I have signed my name to this specification.

HENRI GUSTAVE TISSOT.